UNITED STATES PATENT OFFICE.

HUGH EDWARD PLUNKETT, OF MALDEN, MASSACHUSETTS, ASSIGNOR, BY MESNE ASSIGNMENTS, TO UNITED STATES TROPICAL FOOD COMPANY, OF MALDEN, MASSACHUSETTS, A CORPORATION OF MASSACHUSETTS.

BANANA FOOD AND PROCESS OF MAKING SAME.

1,138,888.      Specification of Letters Patent.      Patented May 11, 1915.

No Drawing.      Application filed June 6, 1914. Serial No. 843,551.

*To all whom it may concern:*

Be it known that I, HUGH EDWARD PLUNKETT, of Malden, in the county of Middlesex and Commonwealth of Massachusetts, have invented certain new and useful Improvements in Banana Food and Processes of Making Same, of which the following is a specification.

My invention relates to a method of preparing bananas for manufacture of breakfast foods, and its main object is to convert the bodies of peeled pulps of either green or partly ripe bananas into granular form suitable for a nutritious breakfast food.

In carrying out my method, the first step is to purify the pulp bodies by freeing them from the stain, which is a fluid permeating the pulp, and this fluid decomposes and imparts a dark color to the pulp if not removed previously to drying of the pulp bodies. This stain is due to the ripening of the rind which gives the latter a dark color, and in time decomposes and imparts a dark color to the pulp if not removed previously to the drying of the pulp bodies.

In carrying out my invention the removal of the stain from the pulp bodies and the drying of the pulp bodies takes place at the same time. The bodies of the green or partially ripe bananas are peeled and placed in a suitable pulp machine from which the product then falls into a bath in a suitable vessel or receptacle containing water at a suitable temperature. This product is then removed from this water and placed on trays which are inserted into a suitable vacuum drying machine to extract the water and stain, thus causing a gradual and complete withdrawal of the stain or staining fluid along with the water for a period of about ten hours.

Preparatory to the extraction of water and stain, the pulp meats or bodies are placed upon perforated trays, and then placed in the vacuum chamber upon steam heated shelves and the doors of the vacuum chamber closed and this supplies the heat for the evaporation and the lifting of the moisture from the pulp bodies and the vacuum sucks the condensation of the moisture, and the stain, included in that condensation is carried into a surface condenser, where it is drawn off as a black liquid. When the material is placed in a vacuum chamber the pumps are set in motion and this creates a vacuum which withdraws the staining liquid along with the water contained in the pulp bodies and purifies the finished product.

The finished product when removed from the drying chamber of the vacuum machine is absolutely dry and free from discoloration which occurs when the stain or staining fluid is present in the pulp bodies. This product so purified and dried retains its natural color and flavor and owing to the removal of the stain produces a suitable food for human beings free from all indigestible constitutents which has heretofore rendered bananas in many cases an indigestible food product. Heretofore banana products have been produced without removing the stain from the bodies either before or during the drying process, and said products have a dark color due to the stain in the bodies and have been used to some extent as an article of food, but are not a proper article of food for human beings owing to the injurious effect of the stain on the system when the food is eaten.

This purified granulated food or crisp granules produced by my method is a proper and valuable food for human beings and may be used as such food alone or mixed with other ingredients, as with milk, syrup or other liquids for breakfast food and either with or without sugar to add to the taste of this product.

Having thus described the nature of my invention, what I claim as new and desire to secure by Letters Patent of the United States, is:—

1. The method of preparing banana bodies for food, which consists first, in reducing the peeled banana meat bodies to a pulpy mass, 2nd, in subjecting the pulpy mass to a bath at a suitable temperature and lastly in subjecting the mass to a vacuum to remove the stain and to dry the mass for food.

2. The method of preparing banana bodies for food, which consists first, in reducing the peeled banana meat bodies to a pulpy mass, 2nd, in subjecting the pulpy mass to a bath at a suitable temperature and lastly in subjecting the mass to a vacuum to remove the stain and to dry the mass for food, at one and the same time.

3. A method of preparing banana bodies for food, which consists, first, in reducing the peeled banana meat bodies to a pulpy mass, second, in subjecting the pulpy mass to a bath at a suitable temperature, and lastly, in subjecting the mass to heat to remove the stain and dry the mass for food.

4. As an article of manufacture, purified banana granules having the natural color of the body of the fruit (after separation from the skin) before such fruit is ripened and free from staining ingredients and dried preparatory for use as food.

In testimony whereof, I have signed my name to this specification in the presence of two subscribing witnesses, this 20th day of May 1914.

HUGH EDWARD PLUNKETT.

Witnesses:
 GERTRUDE N. MARTIN,
 HAROLD J. HAM.